G. R. SCHLEIER.
BRIQUET MACHINE.
APPLICATION FILED MAR. 1, 1920.
1,363,536.
Patented Dec. 28, 1920.
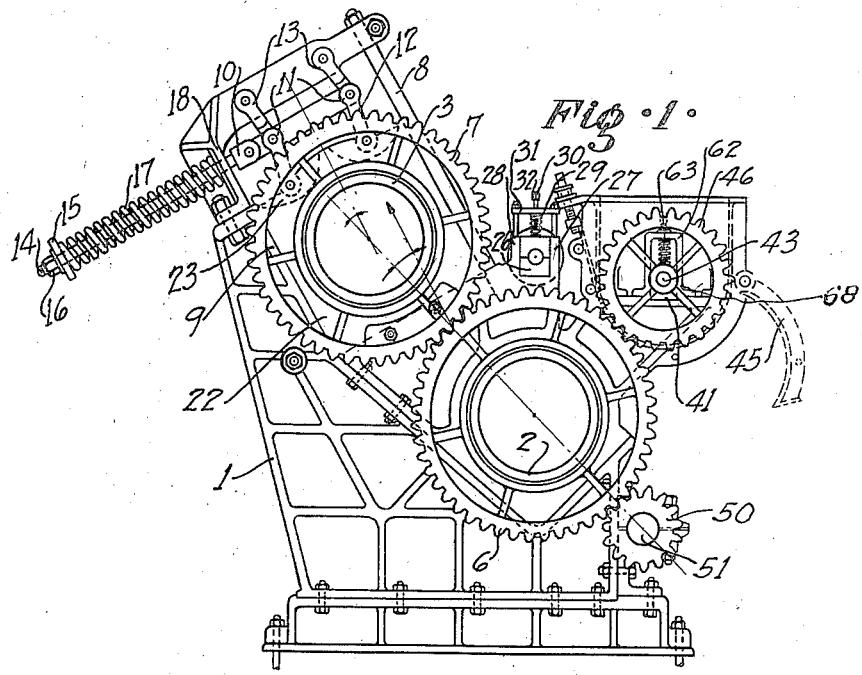
Fig. 1.
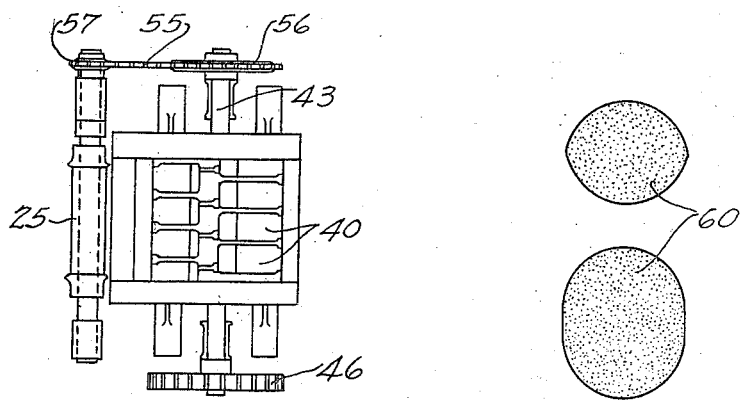
Fig. 2.
Fig. 3.
INVENTOR
G. R. Schleier
BY
Adam E. Fisher
ATTORNEY

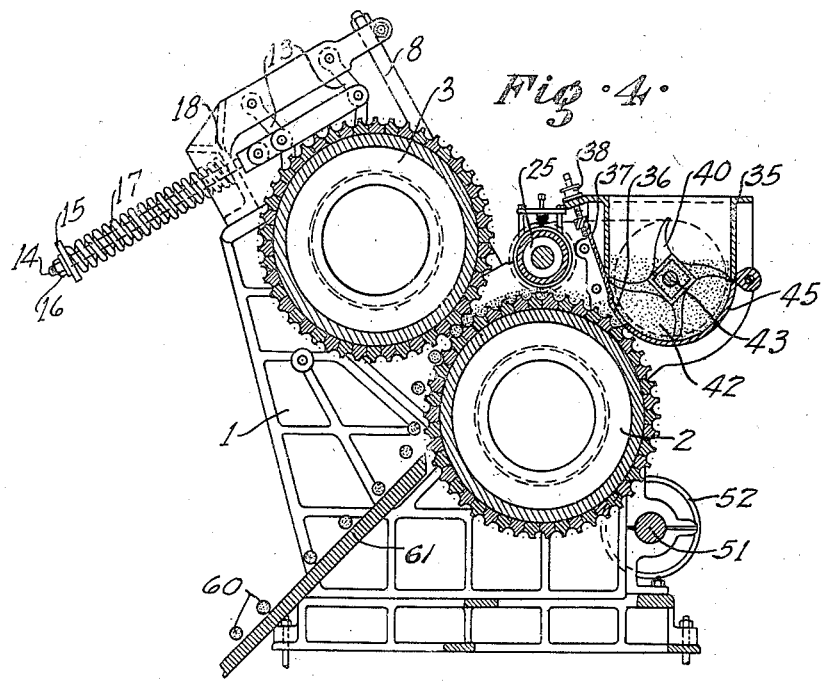
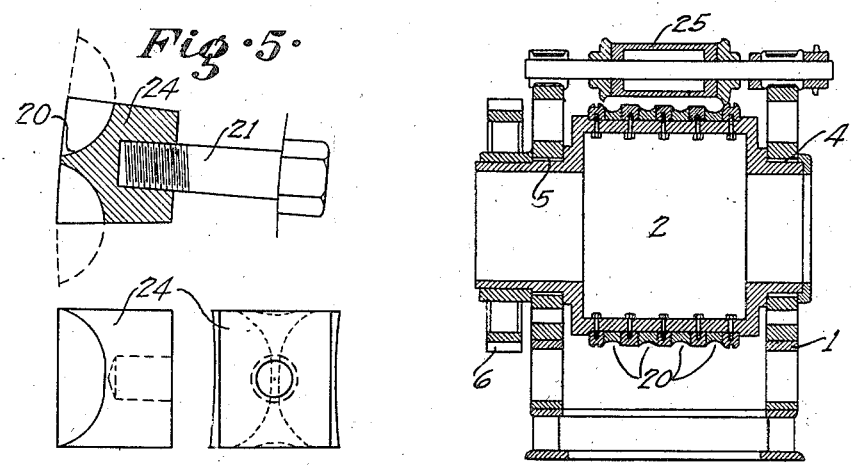

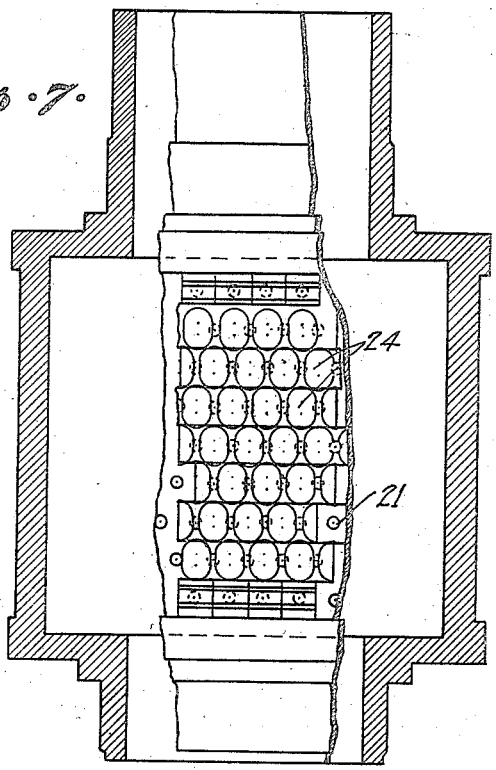
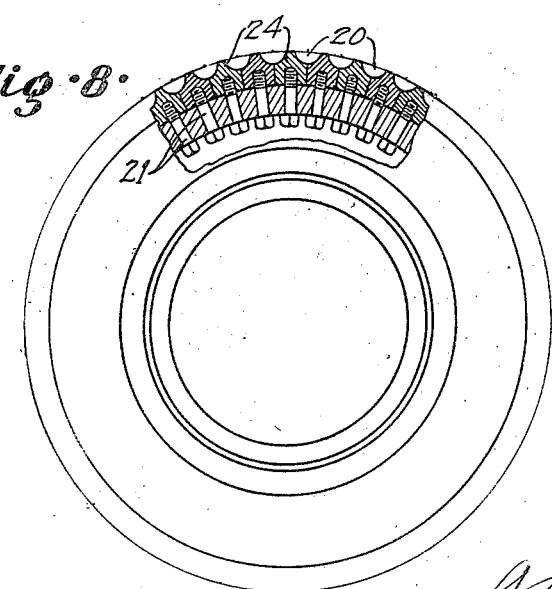

UNITED STATES PATENT OFFICE.

GEORGE R. SCHLEIER, OF ST. LOUIS, MISSOURI.

BRIQUET-MACHINE.

1,363,536.  Specification of Letters Patent.  Patented Dec. 28, 1920.

Application filed March 1, 1920. Serial No. 362,342.

*To all whom it may concern:*

Be it known that I, GEORGE R. SCHLEIER, a citizen of the United States, residing in the City of St. Louis and State of Missouri, have invented new and useful Improvements in Briquet-Machines, of which the following is a specification, reference being had to the accompanying drawings.

The present invention pertains to briquet making machines, for use in converting composite fuel, made up of slack coal, tar, and saw dust, or other suitable materials properly mixed together, into globular briquets for convenient use in stoves and furnaces.

The primary object of the invention is to provide a practical machine for this purpose constructed in an efficient and durable form.

Another object is to provide such a machine wherein the material will rest freely within the molds of the drums, thus preventing the shearing or splitting of the briquets.

Another object is to provide such a machine, the drums whereof are resiliently held into relation with one another by means of springs or the equivalent, so adjusted relative to bearings which press upon one of the drums that the said drum will be always held properly adjusted relative to the other drum so as to prevent shearing of the briquets.

Another object is to provide a mold drum, the molds whereof are separable and detachable from the drum shell, so as to facilitate replacement.

With these and other objects in view, attention is called to the drawings illustrating the preferred form of construction of my invention wherein—

Figure 1 is an end elevation.

Fig. 2 is a top plan view of the hopper showing the revolving scrapers mounted therein.

Fig. 3 is a sectional detail showing the form of the briquets.

Fig. 4 is a vertical, longitudinal, sectional view.

Fig. 5 is a detail showing the method of constructing and mounting the separable molds upon the drums.

Fig. 6 is a transverse, vertical section through the lower drum and upper roller.

Fig. 7 is a sectional plan view of one of the drums within its mounting.

Fig. 8 is a sectional elevation of one of the drums within its casing.

Referring more particularly to the drawings, the invention consists of a suitable supporting frame 1, within the lower, frontal portion of which is journaled the horizontal, receiving mold drum 2, while in the upper portion of the frame and backwardly of the drum 2 at an angle of about 45 degrees, is journaled a similar horizontal, pressure mold drum 3. These drums are cylindrical and the drum 2 is journaled directly in the frame 1 as shown at 4 and 5, while the drum 3 floats upon the drum 2, being for this purpose journaled in the blocks 22, which are freely and slidably mounted between the guide rods 8 and 9. These blocks 22 travel in a path indicated by a straight line disposed at an angle of about 15 degrees toward the perpendicular from a line extended through the axes of the two drums.

The outer extended ends of the drums are provided with rigidly mounted equal and intermeshing gears 6 and 7, so that the rotation of the drum 2 will cause the equal rotation of the drum 3. The guide rods 8 and 9 are disposed at an angle inclined backwardly from the perpendicular, as shown, so as to expose a sufficient portion of the upper face of the drum 2 to receive and carry the material deposited thereupon, under the drum 3.

The drum 3 thus mounted over the drum 2, at an angle thereto from the perpendicular of approximately 45 degrees, and floating resiliently thereupon in a path about 15 degrees nearer the perpendicular than is the line joining the axes of the two drums, permits lumps or accumulations of material to pass readily between the drums, which separate slightly for this purpose without shearing the briquets. In other words, the result of this angular mounting of the drums, in connection with the deviating line of travel of the upper drum moving between its guides, as it separates from the lower drum, and the interrelation of the slopes of the connecting gear teeth, is, on the drums moving apart to pass an accumulation of material, to cause the upper pressure drum to move upward and away from the lower receiving drum on a line nearer to the perpendicular by about 15 degrees than is the line joining the axes of the drums, which is found by experience to maintain the molds 20 in relative register or alinement so as to prevent the shearing or breaking of the briquets.

Immediately above the drum 3 and at each end thereof, is mounted a tensioning element, comprising a tension bar 10, which is pivotally suspended by the upper arms 13 of the toggles 11 to the upper part of the frame 1, while the lower arms 12 are pivoted within the mortises 23 formed in the upper part of the blocks 22. The bar 10 passes slidingly through the plate 18 of the frame 1 and extends backwardly in the form of a screw threaded rod 14, having a washer 15 and nut 16, and carrying a compression spring 17 mounted between the washer 15 and the plate 18. Thus as material passes between the drums 2 and 3, and as the drum 3 is forced upwardly, the tensioning device referred to offers the required degree of resistance against the drum 3 moving away from the drum 2.

Upon the outer curved surfaces of the drums 2 and 3 are mounted a plurality of separable and detachable half molds 20. These molds are individual and similar for both drums, are formed as shown in Fig. 5, and are mounted by bolts 21 piercing the drums from the inside and screwing into the shanks 24. The molds cover the entire surfaces of the drums, with the half molds of one drum registering with those of the other, so that each pair of oppositely disposed half molds will register as the drums rotate, and thus coöperate to mold the briquets to the required form. As shown in the drawings, the molds are mounted in stepped or staggered or over-lapped relation, in order to include as many molds as possible upon the surfaces of the drums. Should one mold become broken, it may be readily removed and the new one inserted by this method of construction.

Immediately above the drum 2 is mounted a compression roller 25, same being horizontally journaled at either end in the adjustable pillow blocks 26 and in alinement with the drum 2. The blocks 26 are slidingly mounted between the guides 27 and 28, while compression springs 29 mounted over rods 30 and extended between the blocks 26 and the upper spaced cross bars 31 tend to depress the blocks 26, and to hold the compression roller 25 down upon the surface of the drum 2. Adjustment screws 32 extend through the bars 31 and springs 29 and engage the blocks 26, as means for adjusting the roller 25 relative to the drum 2. A sprocket 57 is mounted on the extended end of the roller 25. Thus, as material passes over the drum 2, the compression roller 25 operates to evenly distribute and spread the material to the required thickness upon the drum 2 and into the lower molds mounted upon the drum 2. Then as the sheet of material passes on over the drum 2 and under the drum 3, the molds on drum 3 registering upon the molds on drum 2, will complete the forming of the briquets 60, which are discharged by gravity down the chute 61.

A receiving hopper 35 is mounted upwardly and forwardly of the drum 2, same having a port 36 immediately above the drum 2, equal in length to the drum, which port is provided with a number of sliding gates 37, each of which may be regulated up or down by means of the screws 38 so as to increase or decrease the size of the opening at any point, as desired, to regulate the amount of material 42 deposited upon the drum 2. A set of revolving scrapers 40 are mounted longitudinally within the hopper 35, upon the shaft 43, the latter being journaled at the ends in adjustable pillow blocks 41, and these scrapers operate to constantly keep the sides of the hopper 35 clean and free of material. The scrapers 40 and shaft 43 may be resiliently mounted for vertical movement by means of coil springs 63 mounted over pins 64, and thus adapted to press downwardly upon the blocks 41 which move freely within the guides 68. The ends of the shaft 43 are extended and the gear 46 and sprocket 56 are mounted thereon. A door 45 is provided in the lower frontal portion of the hopper 35 for cleaning purposes.

Power is supplied to the machine by means of the gear 50 mounted at the end of the shaft 51 journaled in the frame. The gear 50 engages the gear 6 of the drum 2. At the opposite end of the shaft 51 is mounted the power wheel 52. The scrapers are rotated by means of the gear 46 meshing with the gear 6 of the drum 2. The compression roller 25 is rotated by means of a sprocket chain 55 extended between the sprocket wheel 56 at the end of the shaft 43 and the sprocket wheel 57 upon the outer end of the compression roller 25.

From the above description the operation of the machine is plain, and this machine presents a simple and efficient means for converting composite plastic fuel material into briquets.

While I have herein described a certain specific method of constructing and assembling the elements of my invention, it is understood same may be varied in minor details, not departing from the spirit of my invention as defined in the appended claims.

What I claim to be new and patentable is:

1. A briquet machine comprising a supporting frame; a cylindrical, receiving mold drum journaled horizontally across the lower, frontal part of the frame; a similar pressure mold drum adjustably journaled across the upper, back part of the frame, at a substantial angle from the perpendicular above the lower receiving mold drum, and parallel to and adapted to impinge the receiving mold drum; similar and intermeshing gears rigidly mounted on the outer, extended ends of the two drums; a tensioning attachment for each end of said pressure mold drum, same including toggles pivotally connecting the upper frame with the journal blocks, a tension bar pivotally connected with the elbows of the toggles and extended back transversely, slidingly through the frame, a compression spring mounted over the extended end of the bar and braced against the frame, and an adjustment nut threadedly engaging the outer end of the bar and impinging said spring; a plurality of individual registering half-molds detachably mounted upon the outer surfaces of the mold drums, a compression roller adjustably journaled across the upper part of the frame, parallel and adjacent to the upper side of the receiving drum; a receiving hopper mounted in the frame, upwardly and forwardly of the receiving drum; a port cut in said hopper immediately above the receiving drum, to emit material from the hopper to the drum; and means for connecting and coördinating the several described rotary elements and for applying power to the machine.

2. A briquet machine comprising a supporting frame; a cylindrical, receiving mold drum journaled horizontally across the lower, frontal part of the frame; a similar pressure mold drum, adjustably journaled across the upper, back part of the frame, at a substantial angle from the perpendicular above the lower receiving mold drum, and parallel to and adapted to impinge the receiving mold drum; means for regulating the tension with which the pressure mold drum bears upon the receiving mold drum; a plurality of individual half-molds detachably mounted upon the outer surfaces of the mold drums, in staggered relation so as to fully cover said surfaces, and with the respective half molds of each drum adapted to register with each other to form the complete briquet; a compression roller adjustably journaled across the upper part of the frame, parallel and adjacent to the upper side of the receiving drum; means for feeding material onto the receiving drum as required; and means for connecting and coördinating the several described rotary elements and for applying power to the machine.

3. In a briquet machine employing cylindrical mold drums, a plurality of individual half-molds detachably mounted upon the outer surfaces of the mold drums, in staggered relation so as to fully cover said surfaces, and with the respective half molds of each drum adapted to register with each other to form the complete briquet, said half molds being secured onto the drums by bolts inserted from inside the drums into the shanks of the molds.

4. In a briquet making machine, a cylindrical, receiving mold drum journaled horizontally across the lower, frontal part of the frame; a similar pressure mold drum, adjustably journaled across the upper, back part of the frame, at a substantial angle from the perpendicular above the lower receiving mold drum, and parallel to and adapted to impinge the receiving mold drum; and a tensioning attachment for each end of said pressure mold drum, same including toggles pivotally connecting the upper frame with the journal blocks, a tension bar pivotally connected with the elbows of the toggles and extended back transversely, slidingly through the frame, a compression spring mounted over the extended end of the bar and braced against the frame, and an adjustment nut threadedly engaging the outer end of the bar and impinging said spring.

5. In a briquet making machine, a supporting frame; a cylindrical, receiving mold drum journaled horizontally across the lower, frontal part of the frame; a similar pressure mold drum, adjustably journaled across the upper, back part of the frame, at a substantial angle from the perpendicular above the lower receiving mold drum, and parallel to and adapted to impinge the receiving mold drum; means for regulating the tension with which the pressure mold drum bears upon the receiving mold drum; a plurality of individual half-molds detachably mounted upon the outer surfaces of the mold drums, in staggered relation so as to fully cover said surfaces, and with the respective half molds of each drum adapted to register with each other to form the complete briquet; a compression roller adjustably journaled across the upper part of the frame, parallel and adjacent to the upper side of the receiving drum; means for feeding material onto the receiving drum as required; and means for connecting and coördinating the several described rotary elements and for applying power to the machine.

6. In a briquet machine employing cylindrical mold drums, a receiving hopper mounted in the frame, upwardly and forwardly of the receiving drum; a port cut in said hopper immediately above the receiving drum, to emit material from the hopper to the drum; and a plurality of sliding gates mounted across said port from end to end, each gate being adapted for individual vertical adjustment so as to increase or decrease the opening at that point, as desired.

7. In a briquet machine, employing cylindrical mold drums for forming the briquets, the method of mounting the upper pressure drum resiliently above and back of the lower, receiving drum, so that a line extended through their axes would deviate substantially from the perpendicular, while the resilient movement of the upper, pressure drum away from the lower receiving drum, under the pressure of accumulated material, would be on a line nearer the perpendicular than said line extended through said axes, thus preventing the shearing of the briquets in the operation of the machine.

8. In a briquet machine employing a horizontal receiving drum, and a receiving hopper provided with a port through which the material is discharged upon the drum, a plurality of vertically adjustable gates mounted laterally across said port, to enable the regulation of the amount of material deposited upon the drum at various points through said gates.

9. In a briquet machine, employing cylindrical mold drums for forming the briquets, a lower receiving mold drum journaled horizontally across the lower, frontal part of the frame; and a similar, pressure mold drum, resiliently journaled across the upper, back part of the frame, at a substantial angle from the perpendicular relative to the lower drum, and parallel to and adapted to impinge said lower drum, and so that a line extended through the axes of the drums will deviate more from the perpendicular than will a line indicating the path of resilient movement of the upper, pressure drum away from the lower drum, under the pressure of accumulated material, thus preventing the shearing of the briquets in the operation of the machine, and the said adjustments being made for this purpose.

GEORGE R. SCHLEIER.

Witnesses:
VICTOR R. STROH,
A. K. DOHLE.